Patented Apr. 10, 1934

1,954,336

UNITED STATES PATENT OFFICE 1,954,336

CELLULOSE DERIVATIVE SOLVENT AND COMPOSITION

Cyril J. Staud and Charles S. Webber, Rochester, N. Y., assignors to Eastman Kodak Company, Rochester, N. Y., a corporation of New York No Drawing. Application July 31, 1929,
Serial No. 382,581

4 Claims. (Cl. 106—40)

This invention relates to a solvent combination for cellulose esters and ethers, and particularly to the use of 1-4 dioxan in admixture with water, as a solvent for certain grades of cellulose derivatives.

We are aware of the existence of British Patent No. 275,653 of October 13, 1927 which merely states that 1-4 dioxan is an advantageous solvent for cellulose esters and ethers. This British patent does not, however, describe the particular type of cellulose ester or ether which may be dissolved by the dioxan, and, as hereinafter specifically pointed out, dioxan alone or even in admixture with another organic solvent, as described by the British patent, is not a solvent for the majority of cellulose esters. In fact, we have carefully tested the use of 1-4 dioxan as a solvent and find that of those cellulose derivatives commonly known as "cellulose esters" 1-4 dioxan, when taken alone, will only operate as a solvent for 13.8%–10.8% cellulose nitrate, and cellulose acetate having a high percentage of acetyl content,—namely, in the neighborhood of 36% acetyl or above. The British patent is, therefore, in the class of a mere statement that dioxan can be used as a solvent for cellulose esters and in no way conflicts with our invention as hereinafter set forth. As a matter of fact, there are probably more cellulose esters which are insoluble in 1-4 dioxan alone than there are ones which are soluble, thus practically vitiating the value of the British patent as a disclosure to the public.

We have found that when cellulose is acetylated in any of the well known manners, such as by the use of glacial acetic acid, acetic anhydride and a mineral acid catalyst, the cellulose triacetate thereby produced contains 44.8% acetyl and is soluble in 1-4 dioxan. However, if the cellulose acetate thus produced is hydrolyzed as in U. S. Patent No. 1,634,986, Farrow, July 5, 1927, so as to contain less than approximately 44% acetyl, the solubility of the acetate in 1-4 dioxan alone very rapidly falls off so that when the acetyl content of the acetate has been reduced below 36% and as low possibly as 20%, 1-4 dioxan alone is ineffective as a solvent for the acetate. We have found, however, that cellulose acetate containing from 36% to 20% acetyl may be made freely soluble in 1-4 dioxan when certain percentages of water are mixed with the dioxan and that the addition of small percentages of water to the dioxan does not decrease its solubility of the cellulose acetates having the higher acetyl values.

Whereas, 1-4 dioxan will only dissolve cellulose acetate having an acetyl content of from 44.8% to about 36%, we have found that when 5% to 10% of water is admixed with the 1-4 dioxan that the mixture will readily dissolve cellulose acetate having an acetyl content from 44.8% down to as low as 20% acetyl content. If 20% to 30% of water is admixed with the 1-4 dioxan, the mixture will readily dissolve cellulose acetate having an acetyl content of from 40% down to 20%. A mixture of 60% 1-4 dioxan and 40% water will dissolve cellulose acetate having an acetyl content of from about 34% down to 20%. A mixture of 50% 1-4 dioxan and 50% water has a rather narrow range of solubility for cellulose acetate, dissolving acetate having an acetyl value of from about 30% to 25%.

In other words, as the proportion of water in the 1-4 dioxan-water mixture is increased from 10% to 50%, the upper limit of the acetyl content of the cellulose acetate which will be soluble in the mixture decreases to approximately 30% while the lower limit remains substantially at about 20%. Describing it in another way, we have discovered that the addition of up to 10% of water to 1-4 dioxan greatly increases the range of acetyl value of cellulose acetate which is soluble without lowering the upper limit of acetyl value and that the addition of more than about 10% of water gradually lowers the upper limit of the acetyl value of the cellulose acetate which is soluble in the mixture. Thus, the addition of water to 1-4 dioxan not only is a decided economy but very considerably increases the range of cellulose acetates soluble therein.

In a similar manner, we have found that cellulose nitrate, and cellulose ethers such as cellulose ethyl ether, can be dissolved in a 1-4 dioxan-water mixture containing in the neighborhood of 10% of water, and a considerable saving be thereby effected.

We have also made the discovery that 1-4 dioxan is solvent for a number of the more common plasticizers or softeners for both cellulose acetate and cellulose nitrate. For instance, 1-4 dioxan will not only operate as a solvent for cellulose nitrate but will also dissolve up to 10% by weight of camphor which is so extensively used as a plasticizer for nitrates. We also found that 1-4 dioxan is a good solvent for the more common cellulose acetate plasticizers, such as orthocresylparatoluene sulfonate, triphenyl phosphate, diethyl phthalate monoethyl ether of ethylene glycol, butyl sulfone and alpha chlornaphthalene.

We have also discovered that 1-4 dioxan, either alone or with water, is a suitable solvent for certain mixed esters of cellulose, the dioxan alone being a suitable solvent for such mixed esters as are soluble in acetone and with certain proportions of water being a suitable solvent mixture for other cellulose aceto-esters. For instance, there is a certain class of mixed esters produced by the partial substitution for the acetyl radical in cellulose acetate of the acid radical of the alpha hydroxy mono and dicarboxylic acids, such as lactic, tartaric, glycollic, glyceric, mandelic and malic, the alpha and gamma ketonic acids, such as pyruvic, alpha-keto-butyric, alpha-keto-valeric, and alpha-keto-caproic acids, the aryl carboxylic acids, such as toluic acids, the unsaturated carboxylic acids, such as maleic and the saturated dicarboxylic acids, such as oxalic, succinic and adipic acids. These mixed esters are described in Staud and Webber application, No. 341,032, and Staud and Webber Patents 1,900,871; 1,785,466 and 1,861,200, respectively.

All of these mixed esters when only slightly hydrated are acetone soluble, whereas, after more than slight hydration they become soluble in solvents other than acetone, such as 75% aqueous ethanol, 50% aqueous ethanol, or water. We have discovered that those of these esters which are acetone-soluble are also freely soluble in 1-4 dioxan. The further hydrated mixed esters we found, however, cannot be efficiently dissolved in 1-4 dioxan but are freely soluble in a mixture of 1-4 dioxan and from 10 to 50% by volume of water. The dioxan or dioxan mixture can operate as a solvent for any suitable plasticizer which may be added in the same manner as described above with respect to single acetyl or nitrate esters.

It will be evident, therefore, that we have made the broad discovery that a mixture of 1-4 dioxan and various proportions of water is a solvent for all single cellulose derivatives, and particularly all useful grades of cellulose acetates, at least those having an acetyl content of from 44.8% to about 20%, that 1-4 dioxan is a suitable solvent for certain acetone-soluble mixed esters, that 1-4 dioxan and certain proportions of water is a suitable solvent mixture for certain other mixed esters; and that where 1-4 dioxan is used as a solvent, alone or in admixture with water, it will also frequently operate as a suitable solvent for various plasticizers which it may be desired to also add to the mixture. More specific features of our invention will be evident from a perusal of the foregoing description.

Having thus described our invention, what we claim as new and desire to secure by Letters Patent is:

1. A composition of matter comprising a cellulose organic ester having an acyl content below the minimum necessary to confer acetone-solubility, dissolved in a mixture of 95 to 50 parts of 1-4 dioxan and 5 to 50 parts of water.

2. A composition of matter comprising cellulose acetate having an acetyl content of about 36% to 20%, dissolved in a mixture of 95 to 50 parts of 1-4 dioxan and 5 to 50 parts of water.

3. A highly flexible, extended body which comprises deposited or flowed cellulose organic ester having an acyl content below the minimum necessary to confer acetone-solubility, the body being deposited or flowed from a solution of the cellulose ester in a mixture of 95 to 50 parts of 1-4 dioxan and 5 to 50 parts of water 4. A highly flexible, extended body which comprises cellulose acetate having an acetyl content below the minimum necessary to confer acetone-solubility, the body being formed from a solution of the cellulose acetate in a mixture of 95 to 50 parts of 1-4 dioxan and 5 to 50 parts of water.

CYRIL J. STAUD.
CHARLES S. WEBBER.